March 16, 1971  W. C. ALBERT  3,570,281
GYROSCOPE HAVING LIQUID METAL SUSPENSION MEANS
Filed Dec. 26, 1968
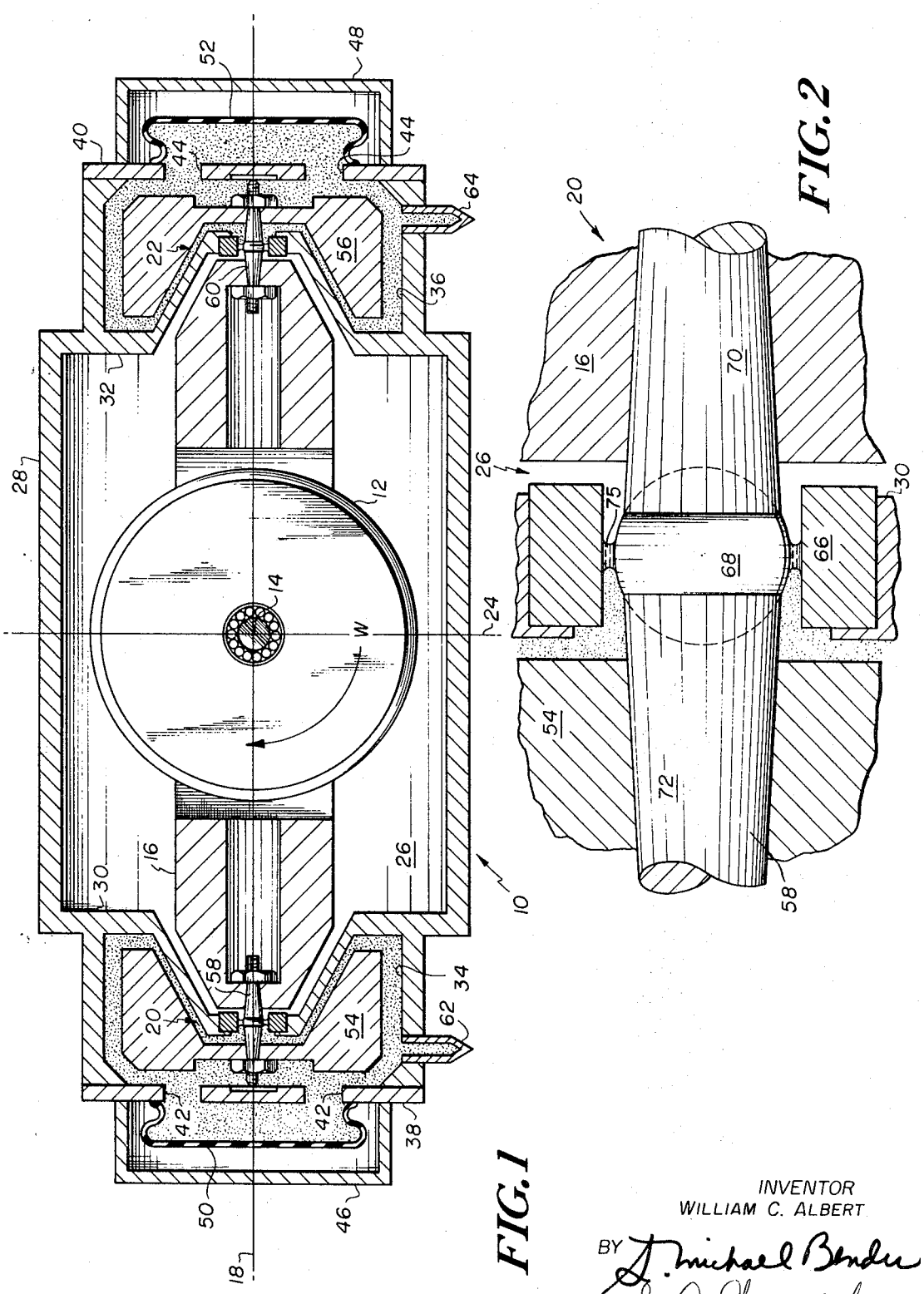
INVENTOR
WILLIAM C. ALBERT
BY
ATTORNEYS

United States Patent Office 3,570,281
Patented Mar. 16, 1971

3,570,281
GYROSCOPE HAVING LIQUID METAL SUSPENSION MEANS
William C. Albert, Waldwick N.J., assignor to Singer-General Precision, Inc., Little Falls, N.J.
Filed Dec. 26, 1968, Ser. No. 786,944
Int. Cl. G01c 19/20
U.S. Cl. 74—5                            11 Claims

ABSTRACT OF THE DISCLOSURE

A single degree-of-freedom gyroscope is provided having its gimbal supported for rotation by a pair of floated trunnions axially displaced along the gyro's output axis. The floats which are solid and homogeneous are suspended in float chambers filled with liquid metal under a positive static pressure. Each float is connected to the gimbal by a shaft comprising a spherical center portion and two axially extending tapered shank portions. The spherical center portion is constrained to rotate with the gimbal in a journal bushing mounted in a wall in the gyro casing with each wall separating the respective float chambers from a central cavity containing the inertia-wheel gimbal assembly. Because of its extremely high surface tension and non-wettable characteristics, the liquid metal is by capillary action prevented from escaping through the clearance between the spherical shaft portion and the bushing into the gyro's center cavity.

SUMMARY OF THE INVENTION

The present invention relates, generally, to the art of gyroscopes, and more specifically, to improvements in single-degree-of-freedom floated type gyroscopes.

In prior art gyroscopes of the class described herein, the gyroscopic element or inertial flywheel is usually supported inside a hollow sealed float member and then, by a pivot arrangement, the sealed float is supported within a sealed housing. The space between the float and housing is then filled with an organic-based floatation fluid. One problem with this arrangement is that two seals are required and this raises the cost of assembly. Moreover, in order to get at the wheel assembly for repairs, the float seal must be disturbed. Another problem is that because the float volume is dictated by the wheel dimensions it is relatively large, thus precluding the use of a very dense floatation fluid such as a liquid metal, for example.

In the present invention, the inertia-wheel gimbal is supported for rotation by a pair of axially displaced floated trunnions which are, in turn, suspended respectively in a pair of housing cavities containing the liquid metal. Because of its high surface tension and non-wetting characteristics, the liquid metal provides an effective rotary seal in the clearance space between the trunnion shafts and the housing. Hence, not only is the sealed floatation member entirely eliminated, but the wheel assembly gimbal is supported for rotation within a liquid metal which, because of its extremely high density, makes it possible to float relatively heavy dense mechanical assemblies within a minimum volume. This imparts to the instrument design a ruggedness implicit with compact structure. Further, by virtue of its homogeneous nature, the liquid metal is not susceptible to chemical breakdown when exposed to extremes of nuclear or solar radiation. Nor will it stratify through prolonged periods of storage or use in the presence of a force gradient. Other important benfits derived from the use of a liquid metal floatation medium over the conventional organic-based fluids include less density-temperature sensitivity, and greater thermal conductivity.

These and other advantages will be made more apparent from a study of the following detailed description of the invention in connection with the accompanying drawings.

BRIEF DESCRIPTION OF THE DRAWINGS

FIG. 1 is a schematic cross-section showing the improved gyroscope of the present invention; and FIG. 2 is a detail showing an enlarged portion of FIG. 1.

DETAILED DESCRIPTION OF THE INVENTON

Turning now to FIG. 1, there is schematically shown in cross-section a gyroscope 10 having a rotor or inertial flywheel 12 adapted to spin about a reference axis 14 extending into the plane of the paper and normal thereto. The rotor which is driven by a conventional motor drive means, preferably of the hysteresis-synchronous type, is rotatably supported by a gimbal 16 which, in turn, is constrained to rotate about an output axis 18 by a pair of axialy displaced pivots generally represented at 20 and 22. In operation, rotation of gyro 10 about its input axis 24 will cause the gimbal 16 to precess about axis 18 in a manner well understood in the art. Gyroscope 10 may also include a pickoff means to sense the rotation of gimbal 16 and a torquer to restore the gimbal to its null or zero reference position. However, since these components are well known and are not germane to the present invention, they have been omitted for clarity of presentation.

The relatively massive flywheel and gimbal assembly ocupies a central cavity 26 defined generally by the outer peripheral wall 28 of the gyro's casing and a pair of opposed axially spaced partitions 30 and 32. The partitions which have a pair of oppositely disposed, axially spaced frusto-conically shaped center sections respectively as shown, separate the center cavity 26 from a pair of axial end cavities 34 and 36. Each end cavity, in turn, includes an end wall 38, 40 having a series of slots or openings 42, 44 for communicating with an enclosure end cap member 46, 48, respectively. An extensible bellows unit 50, 52 cemented or otherwise fixedly fastened to the outside surface of end wall 38, 40 is provided inside the space formed by each end cap enclosure member substantially as illustrated.

In accordance with the present invention, the end cavities 34 and 36 serve as a pair of float chambers for suspending under conditions of neutral buoyancy a pair of float members or trunnions 54 and 56 each of which, in turn, supports one-half the weight of the flywheel-gimbal assembly through a pair of shafts 58 and 60 extending through pivots 20 and 22 in coaxial relation to axis 18. It is further an important feature of the invention to utilize as the floatation medium within the float chambers 34 and 36 a liquid metal such as mercury, for example. Since mercury is extremely dense (e.g., specific gravity of 13.5), this permits the use of float members having relatively small displaceable volumes which means that for a floated gyroscope of given size, most of the bulk and weight can be concentrated in the inertial flywheel resulting in less drift and more accuracy when compared with conventional floated-type gyros featuring large displaceable volume float members, and organic-based low density floatation mediums.

It was previously mentioned that pivot members 20 and 22 constrain the rotation of gimbal 16 about the gyro's output axis 18. As will now be described in connection with FIG. 2, each of these pivot members also functions as a self-lubricating bearing having a rotary seal for preventing the mercury in cavities 34 and 36 from escaping into the central cavity 26 of the gyroscope. Before turning to FIG. 2, however, it will be appreciated that each floated chamber is filled with mercury under a predetermined positive static pressure $P_s$ which is maintained by the action of bellows 50 and 52 while the center cavity 26 of the gyro is filled with an inert gas under pressure $P_G$, where $P_s > P_G$. That is, the mercury is charged into each float chamber through fill tubes 62 and 64 thereby filling the respective cavities and extending each bellows unit in an axial direction relative to axis 18. When the predetermined pressure $P_s$ is reached as measured at the fill tubes, the latter are then crimp sealed as indicated. Of course, any changes in the dimensions of the float chambers due to temperature variations and the like will be compensated for by a corresponding contraction or extension of each bellows unit.

Turning now to FIG. 2 there is shown an enlarged detail of the pivot bearing and rotary seal means 20 according to the present invention. Since the two pivots 20 and 22 are identical, a description of one will be similarly applicable to the other. Pivot means 20 includes a cylindrical journal bushing 66 fixedly fastened to partition 30 at the extremity of the latter's frusto-conical secion whereby the axis of the bushing coincides with axis 18. Shaft 58, whose axis also coincides with axis 18, includes a spherical center portion 68 and two tapered shank portions 70 and 72 integral therewith and outwardly extending axially therefrom as shown. Shank 70 is fixedly connected to gimbal 16 whereas shank 72 is fixedly connected to float means 54 (see FIG. 1). As best seen in FIG. 1, the spherical portion 68 of the shaft is maintained at a substantially central position within the journal bushing by the limiting stop action of end plate 38 against the extreme left-hand terminal portion of shaft 58. Nonetheless, there exists a very small clearance space between the sphere's outside peripheral surface and the inside cylindrical surface of bushing 66 which clearance space is shown greatly exaggerated in FIG. 2 for purposes of illustration. Since the pressure of the liquid metal in float chamber 34 is constantly maintained at a value greater than that corresponding to the pressure of the inert gas occupying the space between the journal bushing 66 and gimbal 16, the liquid metal is continuously urged into this clearance space as shown. However, due to its inherently high surface tension and non-wettable characteristics, the liquid metal will be prevented from discharging through the clearance space and escaping into the gyro's central cavity 26 in accordance with the principles of classical capillary behavior. It will thus be appreciated that in addition to serving as the floatation medium for maintaining the float members and therefore the flywheel and gimbal assembly at neutral buoyancy, the liquid metal functions in conjunction with each pivot means to provide a frictionless hydrodynamic support bearing that is both self-sealing and self-lubricating.

In this connection it may be desirable to introduce a thin film of oil between the spherical portion 68 and the journal such as shown at 75. The oil, which will be at the same pressure as the inert gas in cavity 26, will prevent dry contact between the sphere and the bushing when the gyro is subjected to high g loads and/or extreme vibrations. Incidentally, it will be noted that the "tapered" shank construction of shaft 58 ordinarily insures the integrity of the clearance space and prevents frictional contact resulting from slight angular deviations between the shaft's central axis and the gyro's output axis 18. To elaborate on this, suppose that the shanks 70 and 72 were not tapered and that the shaft were in the form of, say, a solid cylindrical rod, for example. In this situation even slight angular deviations thereof relative to the journal bushing's axis would cause a "pinch" effect against the walls of the bushing leading to a frictional drag on the gimbal. The tapered shanks 70 and 72 therefore prevent the shaft 58 from contacting the bushing walls in the event of slight angular deviations between the shaft and bushing axes.

As mentioned previously with reference to FIG. 1, the center portion of each partition 30 and 32 comprises a frusto-conical section, the extremities of which support the pivot means 20 and 22, respectively. Now it will be observed in FIG. 1 that the shape of each float member 54 and 56 is configured to permit the latter to coaxially and symmetrically straddle or nest relative to its corresponding adjacent frusto-conical section. This arrangement is preferred so that the center of gravity and the center of buoyancy associated with each float member are coplanar with respect to the float's corresponding pivot point, the latter being defined by the respective centers of the spherical portions of shafts 58 and 60. In effect, the float c.g. and c.b. are folded back over the pivot point. By making the float center of buoyancy coplanar with each pivot point, the shear moments and bending moments induced in each shaft by the buoyant forces acting thereon are made to "buck" one another thereby providing a gimbal suspension that is exceedingly stiff. The foregoing float arrangement furthermore contributes to the extremely compact design inhering to the liquid metal suspended gyroscope of the present invention.

Since in conventional gyros, the float is hollow and contains a motor, seals, headers, etc., it is very difficult to make the float center of gravity, the center of buoyancy and the pivot point coincidental. Consequently, external balance weights are usually added to the float to null any resulting net torques about the output axis. However, when there is an increase in temperature, the density of the floatation fluid decreases reducing the buoyant forces accordingly. Balance weights notwithstanding, this results in an increase pivot reaction and a net torque about the output axis causing the gyro to drift. In the present invention, the floats are symmetrical about the pivot axis and made of a solid, homogeneous material. Hence, the pivot point, float c.g., and float c.b. are inherently coincidental along the gyro's output axis. Since the float c.b. and the pivot point are coincidental, there is no net torque generated about the gyro's output axis despite increases in temperature and concomitant decreases in the density of the liquid metal floatation medium. Therefore, the gyro of the present invention has a low temperature-density sensitivity and is accordingly, extremely resistant to thermally sensitive drift producing torques. Also, since liquid metals have a thermal conductivity which is relatively much greater than that of more conventional fluids, temperature gradients within the fluid are proportionally diminished. This greatly reduces convection currents within the fluid which can cause torques on the float and, in addition, greatly reduces the gyro's warm-up time.

Obviously, many additional variations and modifications will be apparent to those skilled in the art without departing from the principles of the present invention.

I claim:

1. A gyroscope comprising:
a housing having an input axis and an output axis;
a gimbal mounted for rotation within said housing about said output axis, said gimbal having an inertial flywheel mounted thereon for rotation about an axis normal to and commonly intersecting each of said aforementioned axes; and
means including a liquid metal floatation medium for maintaining said gimbal under conditions of neutral buoyancy during rotation thereof, wherein said last mentioned means includes a pair of chambers axially disposed on either side of said gimbal relative to said output axis for containing said liquid metal floatation medium respectively, a pair of float members disposed in said chambers respectively and means for fixedly connecting each of said float members to each axial end of said gimbal.

2. The gyroscope of claim 1 further including pivot means supported by said housing and disposed along said output axis for constraining the rotation of said gimbal about said output axis.

3. The gyroscope of claim 1 wherein said housing includes a central chamber for containing said gimbal, said pair of chambers being separated from said central chamber by a pair of axially separated partitions respectively, each one of which includes a journal bushing for rotatably supporting a shaft in a coaxial manner relative to said output axis, said float members being connected to said gimbal through said shafts respectively whereby said float members and said shafts function as floated trunnions respectively for supporting said gimbal and inertial flywheel at said neutral buoyancy condition and said journal bushings serve to constrain the rotation of said gimbal about said output axis.

4. The gyroscope of claim 3 wherein each of said chambers containing liquid metal includes an extensible bellows unit for maintaining the liquid metal therein under constant pressure.

5. The gyroscope of claim 4 wherein said central cavity is charged with an inert gas under a pressure less than that corresponding to said liquid metal.

6. The gyroscope of claim 3 wherein said liquid metal is prevented from escaping through the clearance space between each shaft and each journal bushing respectively by the capillary action thereof.

7. The gyroscope of claim 3 wherein the center of buoyancy and the center of gravity of each of said float members are coplanar and are located in a plane passing through the center of each journal bushing normal to said output axis.

8. The gyroscope of claim 3 in which each of said partitions includes an axially extending conically tapered center section for supporting said journal bushing at the extremity thereof and wherein each float member includes a frusto-conically shaped interior cavity whereby each of said float members extends over the axially extending conically tapered center section of its associated partition in telescoping spaced relation thereto.

9. In a gyroscope having means for supporting an inertia-wheel-gimbal assembly under conditions of neutral buoyancy, said neutral buoyancy being provided by a liquid metal floatation medium comprising means for sealing said liquid metal within a predefined volume, said predefined volume being remotely disposed in relation to said inertia-wheel-gimbal assembly, said liquid metal sealing means also serving as pivot bearing means for constraining the rotation of said inertia-wheel-gimbal assembly about a predetermined axis.

10. The apparatus of claim 9 wherein said dual function sealing and pivot means comprises a cylindrical journal bushing, a shaft mounted for rotation within said bushing and extending between said predefined volume and said gimbal, said shaft and said bushing having a clearance space therebetween wherein said liquid metal may extend partially into said clearance space but is prevented from escaping therethrough by the capillary action of said liquid metal whereby the latter lubricates the bushing and the shaft during rotation of said gimbal.

11. The apparatus of claim 10 wherein said shaft comprises a spherical center portion positioned within said bushing and a pair of tapered shank portions integral therewith and extending axially therefrom in opposite directions relative to said predetermined axis.

References Cited

UNITED STATES PATENTS

| | | | |
|---|---|---|---|
| 2,620,668 | 12/1952 | Lundberg | 74—5 |
| 3,018,142 | 1/1962 | Warnock, Jr. | 308—9 |
| 3,146,530 | 9/1964 | Clark et al. | 33—226 |
| 3,127,776 | 4/1964 | Tarasevich et al. | 74—5 |
| 3,230,778 | 1/1966 | Spetz | 74—5 |
| 3,262,324 | 7/1966 | Taylor | 74—5 |
| 3,420,112 | 1/1969 | Barnett | 74—5X |
| 2,780,940 | 2/1957 | Brown | 74—5.7 |

MANUEL A. ANTONAKAS, Primary Examiner

U.S. Cl. X.R.

308—9